Nov. 12, 1963       F. J. KAISLER ETAL       3,110,816
HIGH RESOLUTION LIGHT PIPE RADIATION DETECTOR
Filed Sept. 20, 1960                    3 Sheets-Sheet 1

WITNESSES:
Bernard R. Gieguey
Robert C. Baird

INVENTORS
Francis J. Kaisler &
Richard F. Higby.
BY Maury I. Hull
ATTORNEY

3,110,816
HIGH RESOLUTION LIGHT PIPE RADIATION DETECTOR
Francis J. Kaisler, Baltimore, and Richard F. Higby, Severna Park, Md., assignors to Westinghouse Electric Corporation, East Pittsburgh, Pa., a corporation of Pennsylvania
Filed Sept. 20, 1960, Ser. No. 57,177
15 Claims. (Cl. 250—227)

This invention relates to improvements in radiation detectors, and more particularly to an improved radiation detector employing a plurality of small light pipes integrated into one detection device.

Many optical applications in general, and infrared applications in particular, require the energy in the image plane to be resolved into discrete elements. Such an application might be a radiation homing device whose optical field of view is resolved into four quadrants by placing four radiation detectors in quadrature in the image plane. The device would then vector angularly up, down, right or left depending upon the detector the target source of radiation imaged upon. In other applications, a mosaic of radiation detectors is placed in the image plane of an optical system, and the detectors sequentially sampled, the response of each element being individually applied to an indicator, for example, a kinescope, to paint a picture of the radiation field.

Other prior art devices such as imaging tubes of which the vidicon is a prime example can be used to obtain high resolution of the image plane but these devices do not possess the elemental sensitivity or dynamic range of response inherent in single cell detectors. This is because the mechanism employed to sample the elements of the image mosaic, usually an electron beam, determines the sensitivity limiting noise level which noise is larger than that inherent in the mosaic material. Further, elements of the mosaic of such devices are not completely isolated from each other resulting in energy spreading of strong signals thereby reducing resolution. Although single cells can and have been made of elemental size and arranged in mosaic configurations to yield their inherently higher sensitivity and provide the necessary isolation to maintain resolution they suffer from inefficiency in the form of utilizing the available radiation, inasmuch as space in the image plane is required for interelemental cell connections. This space is thus lost to the purpose of collecting all of the incident radiation.

The apparatus of the instant invention overcomes these and other disadvantages of the prior art and provides improved sensitivity, eliminates all masking, and obtains complete isolation between the resolving elements of the mosaic, by utilizing condensing light pipes which collect radiation over an entrance pupil considerably larger than the exit pupil where the radiation is emitted. Thus, a detector placed at the exit pupil may be of smaller size than a detector which, placed at the entrance pupil, would collect the same total radiation. An assemblage of these condensing light pipes is provided, whose entrance pupils are the size of the desired resolution elements, located substantially in the image plane, and the total energy incident over the image plane is resolved by the desired degree and exits from the bottom or exit side of the assemblage in discrete bundles. Since the exit pupils are smaller than the entrance pupils, and the individual detectors cover only the exit pupils, considerable space is made available between the exit pupils for electrodes and interelectrode connections, and no masking or extremely close work is needed in the image plane itself.

Accordingly, a primary object of the invention is to provide a new and improved radiation detector.

Another object is to provide a new and improved high resolution radiation detector.

Another object is to provide an improved radiation detector in which the effective detector area required for a given sensitivity and resolution is reduced to a minimum.

Still another object is to provide a radiation detector in which isolation is obtained between resolving elements.

An additional object is to provide a mosaic-type radiation detector in which the necessity for masking in the image plane is eliminated.

An additional object is to provide a radiation detector of increased sensitivity.

A further object is to provide a mosaic-type detector in which ample space for inter-element connections is provided.

Still a further object is to provide a new and improved radiation detector employing a plurality of light pipes in an integrated assemblage, each of the light pipes having an entrance pupil larger than an associated exit pupil.

These and other objects will become more clearly apparent after a study of the following specification, when read in connection with the accompanying drawings, in which.

Figure 1:
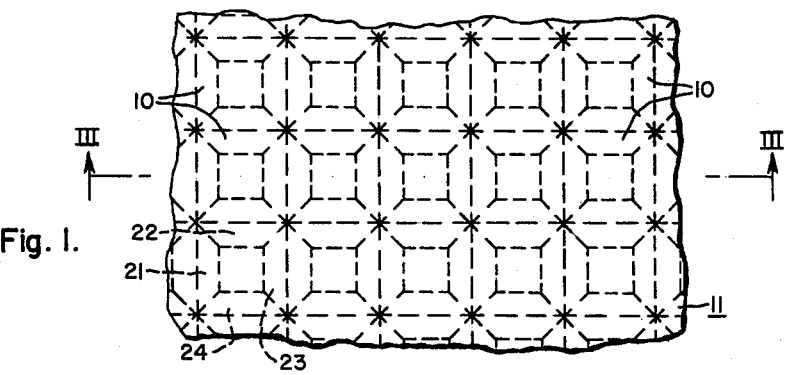
FIGURE 1 is a front or top view of an integrated assemblage of light pipes according to one embodiment of the invention showing the side of the device upon which radiant energy impinges.
Figure 3:
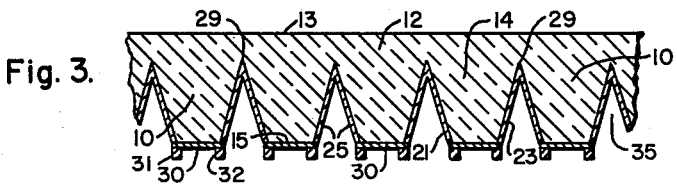
FIG. 3 is a cross-sectional view through the lines III—III of FIG. 1.
Figure 2:
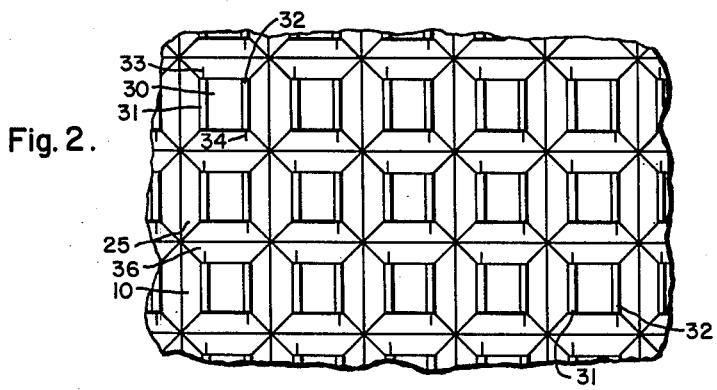
FIG. 2 is a view of the rear or bottom of the integrated assemblage of light pipes of FIG. 1, showing the detector elements covering the exit pupils, and the electrodes and wiring connections thereto.

Referring now to the drawings, in which like reference characters are used throughout to designate like parts, for a more detailed understanding of the invention, and in particular to FIGS. 1, 2 and 3 thereof, there are shown a plurality of individual light pipes 10 formed integrally with each other of a single piece of glass or other transparent material of suitable characteristics, the integrated light pipe device being generally designated 11. The glass of which the integrated light pipe assemblage is composed has adjacent the front surface 13 thereof a solid portion 12 of predetermined thickness extending across the entire light pipe assemblage to form a support structure for the individual light pipe portions, which have entrance pupil portions 14. The individual light pipes are seen to be of solid glass and to comprise four tapering wall surfaces 21, 22, 23 and 24, FIG. 1, all of these surfaces being coated with a suitable light reflecting or reflective material 25, FIG. 3. The back surface of the light pipes which form the exit pupils 15, which back surfaces are preferably parallel to the front surface 13, have disposed thereon the individual radiation sensitive detector elements 30, which may be composed of a suitable light-sensitive material such, for example, as lead sulfide, lead selenide, or lead telluride, each of the detector elements 30 having electrodes 31 and 32 attached thereto, with leads 33 and 34, FIG. 2.

Particular reference is made now to FIG. 3, which shows the detector elements and connecting electrodes and leads in greater detail. It will be readily seen that the spaces 35, FIG. 3, and spaces 36, FIG. 2, between the tapered wall portions of the light pipes provide ample room for running wires 33 and 34 to the aforementioned terminals 31 and 32 and connecting the various detector elements 30 in any desired pattern.

The various light pipes provide for a sensitivity gain in the detector by virtue of the area reduction, light rays being gathered over the relatively large areas of the entrance pupils and condensed into the relatively small areas of the exit pupils, gains of 2 and 3 being readily obtainable.

Figure 4:
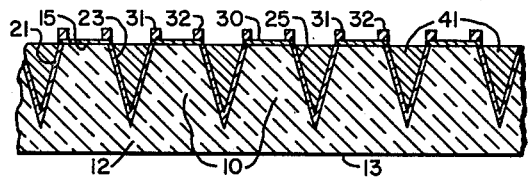
FIG. 4 is a cross-sectional view of a second embodiment of the invention, the section corresponding to one through FIG. 2, and showing in addition filler material in the spaces between the light pipes, according to the preferred embodiment of the invention.

In FIG. 4, a second embodiment of the invention is shown, in which the spaces between light pipes 10 are filled with a filler material 41. It will be understood that all of the spaces, formed by the grooves running both vertically and horizontally, are filled with the filler material 41.

In the manufacture of the device of FIG. 1 and FIG. 4, if desired, the light pipe assemblage may be made from molding or casting the glass or other transmitting medium in the desired form, or by milling out V cuts from a solid piece, the cuts being perpendicular to each other, in gridiron fashion. The exit pupils then appear as discrete plateaus, and the entrance pupils merge continuously throughout the image plane, which passes through points 29. Then light sensitive detector material may be deposited on the exit pupils and electrodes and leads attached, with ample room for connecting. A preferred method may be to fill the crevices or spaces between light pipes with some suitable material up flush with the exit pupils, so that a flat back surface is obtained, as in FIG. 4. Then this back surface may be used as a substrate for standard production methods of chemical deposition of sensitive material and printed circuit electrodes and wiring.

Figure 9:
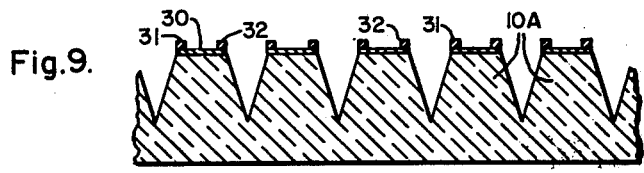
FIG. 9 is a view of still an additional embodiment of the invention.

The coating of reflective material 25 may be omitted, and glass having highly refractive properties used for the light pipes 10. Such an embodiment is shown in FIG. 9.

Figure 5:
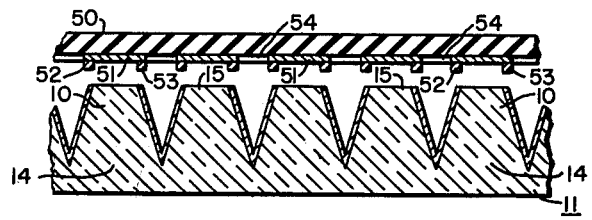
FIG. 5 is a view of another embodiment, a modification of the apparatus of FIGS. 1, 2, and 3.

Particular reference is made now to FIG. 5, in which an additional embodiment of the invention is shown. In FIG. 5, detector elements 51, which correspond to elements 30 of FIG. 3, are deposited or otherwise supported on a supporting plate member 50 of insulating material, in alignment with the exit pupils 15, respectively, each of the light-sensitive elements 51 having terminals 52 and 53, interconnected by, if desired, printed wiring 54. The deposited elements 51 may be flush with the surfaces of exit pupils 15, or a small space may separate the two. Means, not shown, is provided for fixedly mounting support member 50 with respect to light pipe assemblage 11.

Figure 6:
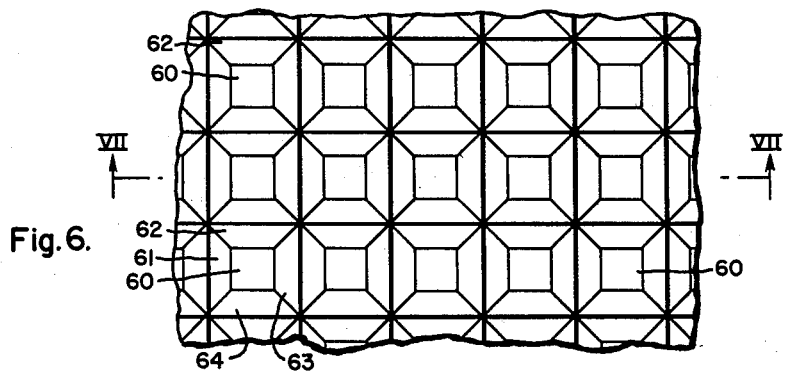
FIGS. 6, 7 and 8 are views of an additional embodiment of the invention.
Figure 7:
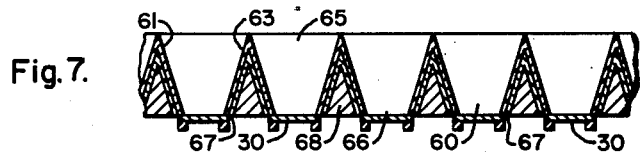
Figure 8:
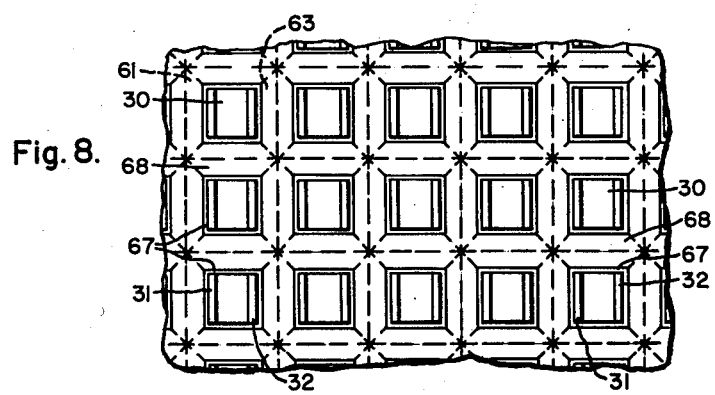

Particular reference is made now to FIGS. 6, 7, and 8 in which an embodiment of the invention is shown in which the light pipes are hollow, the light rays passing through the air or other transparent gaseous medium in which the detector is disposed and which fills the volumes of the pipes. FIG. 6 is a front or top view showing the surfaces upon which the radiant energy impinges, showing light pipes 60 each having tapering walls 61, 62, 63 and 64, formed by hollow V-shaped ridges in the material. FIG. 7, a cross-sectional view through the lines VII—VII of FIG. 6, shows light pipes 60, entrance pupils 65, exit pupils 66, and walls 61 and 63 each having coating material 67 on the back thereof, with filler material 68 in the hollow spaces of the ridges. Detectors 30 are disposed at or on the exit pupils.

The ridges could be solid, if desired, and the walls coated inside the light pipe.

Particular reference is made now to FIG. 9. As previously stated, an embodiment of the invention is shown in which no light-reflective coating is employed on the walls of solid light pipes 10A.

It will be understood by those skilled in the art that glass and other transparent materials have widely differing indexes of refraction; where no light reflecting coating material is employed on the walls of the light pipes, glass of suitable refractive qualities is chosen in accordance with the slope of the walls and the other dimensions of the apparatus. The glass may be one of the germinate glasses or a semiconductor such as silicon.

Figure 10:
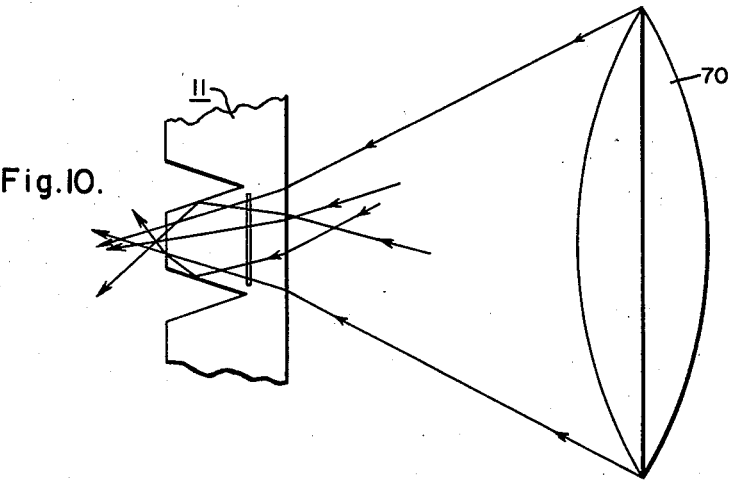
FIG. 10 is a view illustrating optical relationships between an integrated light pipe assemblage and a lens system for focusing radiant energy into the entrance pupils of the light pipes.

Particular reference is made now to FIG. 10. The lens 70 symbolizes an imaging optical system, mounted in predetermined position with respect to light pipe assemblage 11 to focus light rays into and onto the assemblage. Any suitable means, not shown, may be employed for holding the lens 70 and assemblage 11 in desired relative positions.

There has been provided that a more sensitive occlusion free image resolving radiation detector.

The invention is especially applicable for infrared scanning systems where maximum sensitivity is required as well as good resolution in order to discern point sources from extended area sources. This invention facilitates spacial discrimination techniques better than any method known today, since it may readily be used in conjunction with self-cancellation and color cancellation techniques.

It will be readily understood that the filler material 41, FIG. 4, may be omitted if desired.

It will be understood that the front surface 13 as for example in FIG. 3, is not positioned in the image plane, but that the image plane may substantially coincide with points 29, FIG. 3, some leeway being allowable.

The invention includes the use of the lens of FIG. 10 with the pipe assemblages of FIGS. 1, 2, 3, 4, 5, 6, 7, 8 and 9.

It will be understood that detector elements 30 and 51 may be photovoltaic or photoconductive.

If desired, the light pipes may be hexagonal in shape, and formed by three V cuts at 120 degrees with respect to each other.

The walls of the light pipes can be made approximately conical in shape so long as the areas of the entrance pupils are not diminished and resolution over the whole image plane is provided.

The term "light" as employed herein includes the ultraviolet and infrared portions, as well as the visible portion of the spectrum.

It will be understood that the slope of walls which are coated is never at an angle which permits light rays to be reflected back toward the entrance pupil.

Whereas the invention has been shown and described with respect to some embodiments thereof which give satisfactory results, it should be understood that changes may be made and equivalents substituted without departing from the spirit and scope of the invention.

We claim as our invention:

1. A radiant energy detector for light comprising a plurality of similar light pipes disposed in a predetermined pattern with respect to each other, each of the light pipes having an entrance pupil at one end thereof directed toward the source of radiant energy and an exit pupil at the other end thereof, the wall portion of each light pipe tapering toward the exit pupil, the area of the exit pupil being smaller than the area of the entrance pupil, each light pipe condensing the light entering the entrance pupil into the area of the exit pupil, and a plurality of light sensitive detector means, each of said detector means being immediately adjacent to and limited to the area of a respective exit pupil so as to receive light only from said exit pupil, said detector means being physically and electrically isolated from each other.

2. A detector according to claim 1 including in addition, a pair of electrodes on each of the light sensitive detector means for bringing leads thereto, and leads disposed in the spaces between light pipes at the exit pupil ends thereof.

3. A radiation detector for light consisting of a glass plate member transparent at the wavelength of radiation to be detected, the surface of said glass plate member upon which the radiation impinges being smooth, the other side of the glass plate member having therein a plurality of parallel V-shaped grooves running in one direction and a plurality of parallel V-shaped grooves running in another direction perpendicular to the first-named direction to form a plurality of substantially rectangular light pipes, each of the light pipes having an entrance pupil at the end thereof near the smooth surface and an exit pupil at the other end thereof, each of the light pipes having tapering walls from the entrance pupil toward the exit pupil, the exit pupils being small relative to the entrance pupils, the walls being coated with a light-reflective material, and a plurality of light sensitive detector means, each of said detector means being located on and limited to the area of a respective exit pupil so as to receive light only from said exit pupil, said detector means being physically and electrically isolated from each other.

4. A radiation sensitive detector device consisting of a plurality of light pipes integrated into a single detector device, each of the light pipes having an entrance pupil and an exit pupil, the exit pupils being smaller than the entrance pupils, the walls of the light pipes tapering toward the exit pupils, the exit pupils having flat surfaces and each having disposed thereon a radiation sensitive detector element limited to the area of a respective exit pupil so as to receive light only from the respective exit pupil, said detector means being physically and electrically isolated from each other.

5. A high resolution radiation detector comprising a plate member composed of material transparent to radiation of the wavelength to be detected, one surface of the plate member being smooth and directed toward the source of radiation, the other side of the plate member having a plurality of V-shaped grooves therein to form a plurality of truncated light pipes with walls tapering away from the aforementioned smooth surface to provide exit pupils smaller than the opposite ends of said truncated light pipes, the wall surfaces of each of the light pipes being coated with a light-reflective material, and a plurality of radiation sensitive detector elements no larger than said exit pupils disposed upon and limited to the respective exit pupils of the plurality of said light pipes, said detector elements being physically and electrically isolated from each other.

6. A detector according to claim 5 additionally characterized as having filler material in the spaces between the light pipes.

7. A detector device according to claim 4 additionally characterized as having filler material in the spaces between the light pipes.

8. A high resolution radiation detector for light comprising a plurality of light pipes each having an entrance pupil and an exit pupil small relative to the entrance pupil, the light pipes being disposed in a predetermined pattern with respect to each other, one of a plurality of physically and electrically isolated radiation sensitive means on each of the light pipes at the exit pupils of a size no larger than the latter, and electrodes connected to each of the radiation sensitive means for wiring the radiation sensitive means in a predetermined pattern, each of the light pipes having a truncated wall portion coated on the tapering surfaces thereof with a light-reflective material, each of the light pipes gathering light energy over a relatively large area and condensing the light energy into a relatively small area, the radiation detector being characterized by high sensitivity.

9. A radiant energy detector for light comprising a plurality of similar light pipes disposed in a predetermined pattern with respect to each other, each of the light pipes having an entrance pupil at one end thereof directed toward the source of radiant energy and an exit pupil at the other end thereof, the wall portion of each light pipe tapering toward the exit pupil, the area of the exit pupil being smaller than the area of the entrance pupil, each light pipe condensing the light entering the entrance pupil into the area of the exit pupil, a plurality of physically and electrically isolated light sensitive devices equal in number to the number of light pipes, each of the light sensitive devices having an area substantially equal to the area of an exit pupil, and means mounting the plurality of light sensitive devices adjacent the exit pupils of the plurality of light pipes respectively and in substantial alignment therewith.

10. A detector according to claim 9 in which the light pipes are additionally characterized as having the walls coated with a light-reflective material.

11. A detector for light energy comprising a plate member composed of a transparent material, the member having a first plurality of V-shaped ridges of predetermined height running parallel to each other at equally spaced intervals and a second plurality of V-shaped ridges of said predetermined height running transverse to the first plurality of ridges and parallel to each other at equally spaced intervals substantially equal to the spaced intervals between the first plurality of ridges to form a plurality of similar hollow light pipes, the apexes of the ridges being on the side of the plate member upon which light energy impinges, the apexes defining entrance pupils for the light pipes, each of the light pipes having an exit pupil small relative to the entrance pupil, and a plurality of light energy sensitive detector elements equal in number to the plurality of light pipes physically isolated from each other and disposed in predetermined positions with respect to the exit pupils thereof for receiving light from the respective corresponding exit pupils.

12. A detector according to claim 11 additionally characterized as having the walls of the light pipes coated with a light-reflective material.

13. A detector according to claim 1 including in addition lens means for focusing radiant energy into the light pipes, the entrance pupils lying substantially in the image plane of the lens means and providing resolution of substantially the entire area of the image plane.

14. A detector according to claim 3 including in addition lens means for focusing light rays into the light pipes, the entrance pupils lying substantially in the image plane of the lens means and providing resolution of substantially the entire area of the image plane.

15. A detector according to claim 11 including in addition lens means for focusing light rays into the light pipes, the entrance pupils lying substantially in the image plane of the lens means and providing resolution of substantially the entire area of the image plane.

References Cited in the file of this patent

UNITED STATES PATENTS

| | | |
|---|---|---|
| 2,010,543 | Gray | Aug. 6, 1935 |
| 2,350,712 | Barsties | June 6, 1944 |
| 2,789,193 | Anderson | Apr. 16, 1957 |
| 2,831,634 | Luhn | Apr. 22, 1958 |
| 2,839,646 | Hester | June 17, 1958 |
| 2,875,350 | Orthuber et al. | Feb. 24, 1959 |
| 2,923,828 | Bernath | Feb. 2, 1960 |
| 2,936,379 | Orthuber et al. | May 10, 1960 |
| 2,964,636 | Cary | Dec. 13, 1960 |